United States Patent Office 3,141,895
Patented July 21, 1964

3,141,895
PROCESS FOR PRODUCING γ-HYDROXYBUTYRO-
NITRILE AND γ-BUTYROLACTONE
Takashi Komatsu, Ryoji Iwanaga, and Jiro Kato, Tokyo,
Japan, assignors to Ajinomoto Co., Inc., Tokyo, Japan
No Drawing. Filed July 23, 1962, Ser. No. 211,893
Claims priority, application Japan July 25, 1961
7 Claims. (Cl. 260—343.6)

The present invention relates to improvements in the manufacture of γ-butyrolactone. This compound, also known as 4-hydroxy-butanoic acid lactone, is the inner anhydride of 4-hydroxybutyric acid and is useful as a solvent, for instance.

While various processes for the production of γ-butyrolactone have been proposed, they are industrially disadvantageous because they require either expensive raw materials, which are difficult to obtain, and/or give a poor yield.

It is the primary object of this invention to provide an industrial process for the manufacture of γ-butyrolactone from a cheap starting product, i.e. β-cyanopropionaldehyde. This raw material can be industrially produced, for instance, by subjecting acrylonitrile to the known oxo-process.

In accordance with the invention, β-cyanopropionaldehyde is reduced by hydrogen to form γ-hydroxybutyronitrile, the γ-hydroxybutyronitrile is hydrolyzed and γ-butyrolactone is recovered from the acidic hydrolyzate.

Since the starting material has two functional groups, i.e. a cyano and an aldehyde group, severe reducing conditions, which would cause both functional groups to be reduced, must be avoided. We have found that this can be done and only the aldehyde group will be hydrogenated if proper reaction conditions are maintained. These mild conditions include the absence of even a trace of alkali in the reaction and the avoidance of elevated temperatures.

If hydrogenation is carried out in the presence of alkali, both functional groups will be hydrogenated and butanolamine will be formed. Furthermore, the presence of alkali may also cause the polymerization of the aldehyde. For this reason, a hydrogenation catalyst containing even traces of alkali, such as common Raney nickel, which is produced with the aid of caustic soda, must be avoided.

An elevated temperature above about 100° C. also will cause hydrogenation of both functional groups, wherefor the hydrogenation must be carried out below this temperature. Room temperature is preferred.

Preferred catalysts for the hydrogenation of β-cyanopropionaldehyde to γ-hydroxybutyronitrile include palladium on charcoal, platinum, copper-chromium and nickel on diatomaceous earth. Pressure and/or temperature conditions may be varied in accordance with the amount and/or the kind of hydrogenation catalyst used. As stated, room temperature is preferred and the pressure may vary between about 20 kg./sq.cm. and about 300 kg.sq.cm.

The process of the invention will proceed according to the following reaction equations:

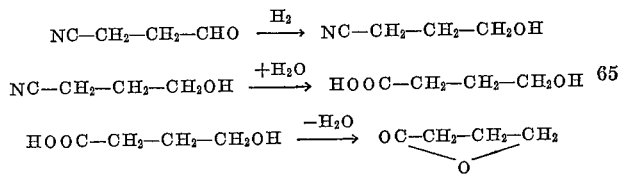

The following examples illustrate the invention without in any way limiting the same:

Example 1

An aqueous solution of β-cyanopropionaldehyde was prepared by dissolving 25 g. of β-cyanopropionaldehyde (boiling point 85.1–85.5° C. at a pressure of 3 mm. Hg; purity: 99.3% by hydroxylamine method) in 100 ml. of water. 2.2 g. of catalyst (palladium content 5%) was prepared by adsorbing palladium chloride on active charcoal and activating the mixture with hydrogen under pressure. The aqueous solution and the catalyst were poured into an autoclave of 300 ml. capacity. The mixture was put in the autoclave under an initial hydrogen pressure of 120 kg./cm.² at room temperature until absorption of hydrogen gas terminated. After the termination of the hydrogen gas absorption, the reaction product was separated from the catalyst. 18 g. of sodium hydroxide was added to the thus obtained clarified reaction solution. The mixture was refluxed for 2 hours. After the hydrolyzate had been concentrated in vacuo, conc. hydrochloric acid was added to the residue until a pH value of 5 was reached. After the acidic solution was continuously extracted with ether, the ether layer was dried by means of anhydrous sodium sulfate and the ether was removed from the dried solution by distillation in vacuo. There was obtained a residue of 14.5 g. of a fraction having a boiling point of 64–67.5° C. at a pressure of 3 mm./Hg. The yield was 56% of the theoretical amount. The analysis was as follows:

|  | C, percent | H, percent |
| --- | --- | --- |
| Calculated for $C_4H_6O_2$ | 55.80 | 7.03 |
| Found | 55.63 | 7.17 |

The spectrum of infra-red absorption of the thus obtained product was identical with that of γ-butyrolactone.

Example 2

The process was carried out as in Example 1, except that 2 g. of a nickel-diatomaceous earth catalyst was used instead of palladium-charcoal. The yield of γ-butyrolactone was 13.0 g.

Example 3

The process was carried out as in Example 2, except that 1 g. of a copper-chromium catalyst was used instead of palladium-charcoal. The yield of γ-butyrolactone was 12.0 g.

What we claim is:
1. In a process of producing γ-butyrolactone, the step of reacting beta-cyanopropionaldehyde with hydrogen in the presence of a hydrogenation catalyst selected from the group consisting of palladium on charcoal, platinum, copper-chromium, and nickel on diatomaceous earth, at a temperature below 100° C. in the absence of alkali until gamma-hydroxy-butyronitrile is formed, the pressure of said hydrogen being between about 20 and 300 kilograms per square centimeter.

2. In a process as set forth in claim 1, said temperature being room temperature.

3. A process for producing gamma-butyrolactone, in which comprises:
   (a) reacting beta-cyanopropionaldehyde with hydrogen in the pressure of a hydrogenation catalyst selected from the group consisting of palladium on charcoal, platinum, copper-chromium, and nickel on diatomaceous earth, at a temperature below 100° C. and in the absence of alkali until gamma-hydroxybutyronitrile is formed, the pressure of said hydrogen being between about 20 and 300 kilograms per square centimeters;

(b) hydrolyzing the gamma-hydroxybutyronitrile formed in the presence of water and alkali; and
(c) acidifying the aqueous hydrolyzate.

4. A process as set forth in claim 3, wherein said hydrolyzate is acidified to a pH of 5.

5. A process as set forth in claim 3, wherein said hydrolyzate is acidified with hydrochloric acid.

6. A process as set forth in claim 3, wherein said alkali is sodium hydroxide.

7. A process as set forth in claim 3, wherein said temperature is room temperature, said hydrolyzate is acidified with hydrochloric acid to pH 5, and said gamma-hydroxybutyronitrile is hydrolyzed in the presence of aqueous sodium hydroxide.

References Cited in the file of this patent

UNITED STATES PATENTS

| | | |
|---|---|---|
| 2,072,861 | Amend et al. | Mar. 9, 1937 |
| 2,305,466 | Carter | Dec. 15, 1942 |
| 2,564,131 | Schreyer | Aug. 14, 1951 |
| 3,076,033 | Friedman | Jan. 29, 1963 |

OTHER REFERENCES

Wagner et al.: Syn. Org. Chem., New York, 1953, Wiley, pp. 151, 533, 608 and 659.

Wagner et al.: Syn. Org. Chem., New York, 1953, Wiley, p. 149.